(12) United States Patent
Abou Halima et al.

(10) Patent No.: US 11,448,253 B2
(45) Date of Patent: Sep. 20, 2022

(54) POSITIVE LOCKING FASTENER

(71) Applicant: LISI AEROSPACE, Paris (FR)

(72) Inventors: Mohamed Abou Halima, Gennevilliers (FR); Loïc Meiffre, Conflans Sainte-Honorine (FR)

(73) Assignee: LISI AEROSPACE, Paris (FR)

(*) Notice: Subject to any disclaimer, the term of this patent is extended or adjusted under 35 U.S.C. 154(b) by 466 days.

(21) Appl. No.: 16/621,617

(22) PCT Filed: Jun. 14, 2018

(86) PCT No.: PCT/FR2018/051414
§ 371 (c)(1),
(2) Date: Dec. 11, 2019

(87) PCT Pub. No.: WO2018/229444
PCT Pub. Date: Dec. 20, 2018

(65) Prior Publication Data
US 2020/0149580 A1 May 14, 2020

(30) Foreign Application Priority Data
Jun. 15, 2017 (FR) ........................................ 1755416

(51) Int. Cl.
*F16B 39/08* (2006.01)
*F16B 37/14* (2006.01)

(52) U.S. Cl.
CPC .............. *F16B 39/08* (2013.01); *F16B 37/14* (2013.01)

(58) Field of Classification Search
CPC .......... F16B 21/12; F16B 37/14; F16B 39/00; F16B 39/08; F16B 39/10; F16B 41/005;
(Continued)

(56) References Cited

U.S. PATENT DOCUMENTS

| 914,908 A | * | 3/1909 | Young | F16B 39/04 411/320 |
| 1,016,237 A | * | 1/1912 | Tinnin | F16B 39/08 411/197 |

(Continued)

FOREIGN PATENT DOCUMENTS

| EP | 0576871 | 1/1994 |
| EP | 1496274 | 1/2005 |

(Continued)

OTHER PUBLICATIONS

Pöll, Andreas, International Search Report, dated Oct. 18, 2018, 5 pages, European Patent Office, P.B. 5818 Patentlaan 2, NL-2280 HV Rijswijk, Netherland.

(Continued)

*Primary Examiner* — Roberta S Delisle
(74) *Attorney, Agent, or Firm* — Henricks Slavin LLP

(57) ABSTRACT

The invention relates to a positive locking fastener comprising: a screw (1) having a radial hole (120) at a threaded portion (12); a nut (2) having a tightening portion (21); a cap (3); and a pin (4). The cap has a locking portion (31) intended to cover the threaded portion and a blocking portion (30) intended to engage with a tightening portion of the nut.

The blocking portion comprises at least one pair of diametrically opposed openings (32) suitable for allowing a pair of openings to be aligned with the radial hole, in order to allow the pin to be inserted and thus lock the fastening regardless of the relative position of the nut with respect to the screw. The invention also relates to a method for implementing the fastener according to the invention.

12 Claims, 8 Drawing Sheets

(58) Field of Classification Search
CPC . Y10S 411/91; Y10S 411/924; Y10S 411/926
USPC ...... 29/525.02, 525.11; 411/190–191, 372.5, 411/372.6, 373, 429, 431, 513, 514
See application file for complete search history.

(56) References Cited

U.S. PATENT DOCUMENTS

| | | | | |
|---|---|---|---|---|
| 1,047,691 | A * | 12/1912 | Olsen et al. ............ | F16B 39/32 411/300 |
| 1,320,095 | A * | 10/1919 | Robinson .............. | F16B 39/108 411/320 |
| 1,473,170 | A * | 11/1923 | Berthold ................ | F16B 39/04 411/945 |
| 1,743,350 | A * | 1/1930 | Hopkins ................ | F16K 17/06 411/374 |
| 1,913,555 | A * | 6/1933 | Lyle ........................ | F16B 39/04 267/164 |
| 2,365,433 | A | 12/1944 | Polizzi | |
| 3,259,346 | A * | 7/1966 | Rogers ................... | A01K 97/10 403/197 |
| 3,548,704 | A | 12/1970 | Kutryk | |
| 3,965,954 | A * | 6/1976 | Lofredo ................. | F16B 39/04 411/959 |
| 5,360,303 | A | 11/1994 | Behrens et al. | |
| 9,845,822 | B2 * | 12/2017 | Pailhories ............. | F16B 39/284 |
| 10,400,812 | B2 * | 9/2019 | Poster .................... | F16B 33/02 |
| 2010/0080666 | A1 * | 4/2010 | Dahl ....................... | F16B 39/02 411/353 |
| 2011/0296668 | A1 * | 12/2011 | Emmerich .............. | F16B 39/28 53/474 |
| 2012/0141226 | A1 * | 6/2012 | Jackson .................. | F16B 39/08 411/315 |
| 2013/0149068 | A1 * | 6/2013 | Jackson .................. | F16B 39/04 411/315 |
| 2014/0101923 | A1 * | 4/2014 | Clark .................... | F16B 41/002 29/525.11 |
| 2014/0271036 | A1 * | 9/2014 | Emmerich ............ | F16B 33/004 411/500 |
| 2017/0102023 | A1 | 4/2017 | Schepergerdes | |
| 2021/0071705 | A1 * | 3/2021 | Rice ....................... | F16B 39/04 |

FOREIGN PATENT DOCUMENTS

| | | |
|---|---|---|
| EP | 2044342 | 9/2014 |
| EP | 3104027 | 12/2016 |
| FR | 615364 | 1/1927 |
| FR | 825722 | 3/1938 |
| FR | 1557874 | 2/1969 |
| JP | S5388657 | 7/1978 |
| JP | H01146009 | 10/1989 |
| JP | 3629486 | 3/2005 |

OTHER PUBLICATIONS

Pöll, Andreas, Written Opinion, dated Oct. 18, 2018, 5 pages, European Patent Office, D-80298 Munich, Germany.

* cited by examiner

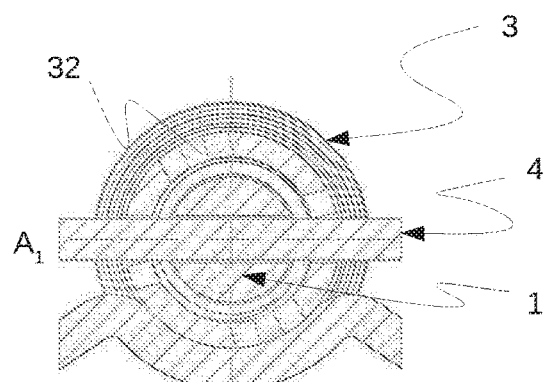
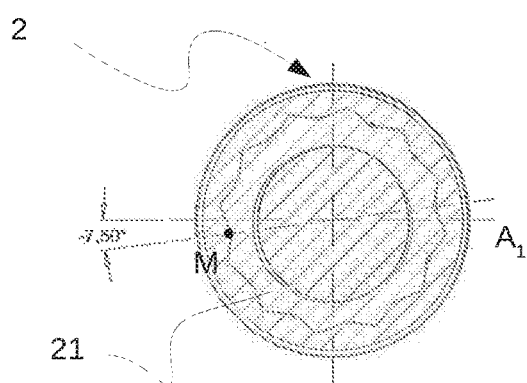
Figure 6a Figure 6b
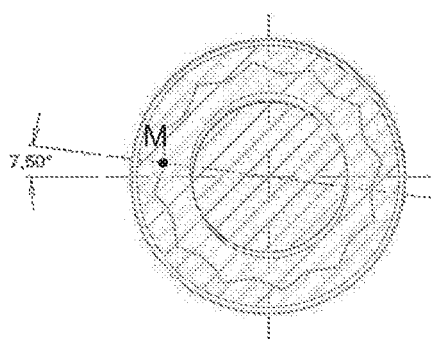
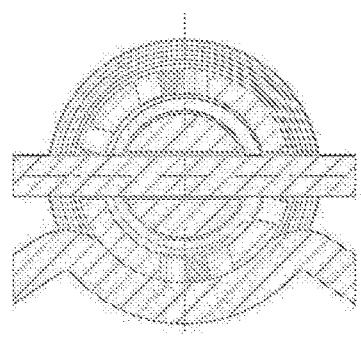
Figure 6c Figure 6d
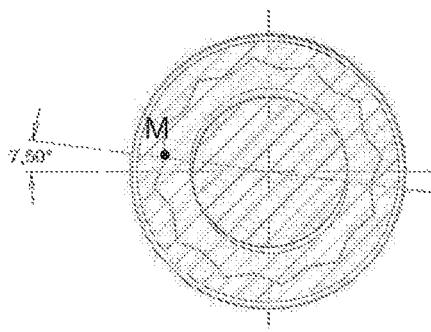
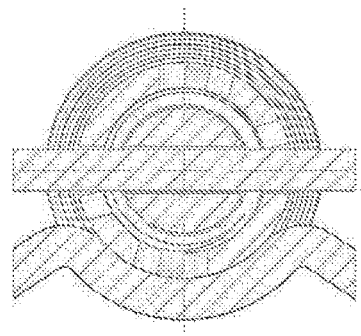
Figure 6e Figure 6f
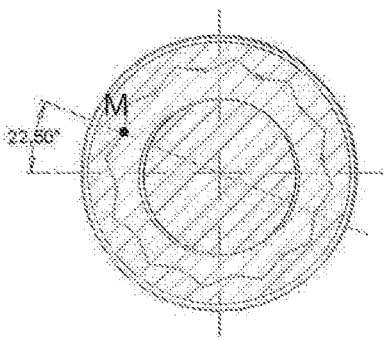
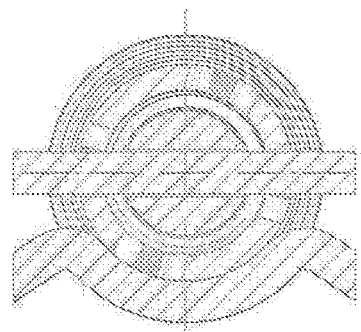
Figure 6g Figure 6h

POSITIVE LOCKING FASTENER

CROSS REFERENCE TO RELATED APPLICATIONS

This application is a National Stage of International Application No. PCT/FR2018/051414, filed Jun. 14, 2018, which claims priority from FR 17 55416 filed Jun. 15, 2017, the entire contents of which are incorporated herein by reference.

TECHNICAL FIELD

The invention belongs to the field of mechanical fasteners.

More particularly, the invention relates to the field of mechanical fasteners with positive locking.

STATE OF THE ART

A problem raised in securing a structural assembly by threaded fasteners is loosening in use, generally due to vibrations. Positive locking devices are provided to solve this problem.

It is known to use locking wires to avoid loosening of the fasteners by vibration. A disadvantage of such wires is that they do not sufficiently limit the looseness of the fasteners. U.S. Pat. No. 5,360,303 describes a device for locking a nut on a screw. The device comprises a cap placed on the nut and a threaded portion of the screw traversed by a radial hole. Holes on a circumference of the cap allow a pin to be inserted through the radial hole and holes of the cap when they are aligned.

The relative position of the cap relative to the nut being limited to a given number of configurations depending on a number of teeth formed in the cap to be engaged on corners of the nut, a drawback of this solution is that, despite an increased number of positions of the cap in respect to the nut, the alignment of the radial hole with one of the holes of the cap is not always possible, depending on the position of the nut after installation of the fastener. It can therefore be necessary to tighten again the nut so as to be able to insert the pin into the cap and the radial hole, the nut being then no longer tightened to the nominal torque.

SUMMARY OF THE INVENTION

The invention proposes to solve the problems of the prior art.

The invention relates to a cap intended to engage with a nut and intended to receive a pin, said nut comprising a tightening portion of angular period θ about a main axis of said nut, said cap being substantially of revolution about a main axis and comprising:
- a blocking portion at a first end, said blocking portion defining an inner surface corresponding to a housing intended to engage with the tightening portion of the nut such that the main axis of said nut is substantially coincident with the main axis of the cap when said cap is in place on said nut;
- a locking portion at a second end, a side wall of said locking portion comprising at least one pair of through openings adapted to receive the pin, said openings of one pair being arranged symmetrically with respect to the main axis, in a direction defined by centers of said openings in the pair, the openings being similar in dimensions with a height h along the direction of the main axis and a length defined by an angular sector φ intended to allow a movement of a rectilinear portion of the pin in any of the at least one pair of openings, said openings being located substantially at a same height of said main axis;

said blocking and locking portions being fixed and secured together and said cap being characterized in that the angular sector φ is equal to:

$$\varphi = \frac{\theta}{N}$$

where N is a number of pairs of openings.

In one embodiment, the locking portion comprises at least two pairs of openings and the pairs of openings are arranged such that:
- for each of said pairs of openings, regardless of the position of said cap when the latter is in place on the nut, a pair of openings covers a single portion of an elementary angular sector, of angular amplitude θ, said portion being associated with a portion of the elementary pattern of the tightening portion of the nut;
- a joining of the portions of the elementary angular sector covered by half the openings of said pairs of openings covers the entirety of said elementary angular sector.

In one embodiment, the apertures are notches.
In one embodiment, the apertures are oblong holes.
In one embodiment, the blocking portion and the locking portion are connected together by a connecting portion.
In one embodiment, the cap has a wall closing said cap at the second end.

The invention also relates to a positive locking fastener comprising:
- a screw having a threaded portion having a radial hole passing through said threaded portion;
- a nut intended to be placed on the screw, said nut comprising a tightening portion, an outer surface of which defines in a horizontal plane an angular period profile θ about a main axis of said nut; said fastener being characterized in that it further comprises:
- a cap according to the invention, an inner volume of the locking portion being of defined dimensions for containing a free end of the screw protruding from the nut, said cap being further intended to engage with the tightening portion of the nut, the inner surface of the blocking portion forming a recess complementary to the profile of the tightening portion and the angular sector φ being equal to a fraction of the angular period of said profile;
- a pin having a straight portion for insertion into a pair of openings of the cap and into the radial hole of the screw, when said holes and openings are aligned, so as to lock the fastener.

In one embodiment:
- the nut is a twelve-point nut defining a star-shaped profile at twelve vertices of angular period 30°;
- the cap has two pairs of openings;
- the angular sector φ is equal to 15°;

In one embodiment, the pin includes a curved portion adapted to conform to an outer surface of the locking portion of the cap to maintain said pin in place.

In one embodiment, the pin is a spring pin.
In one embodiment, a minimum radial dimension of the first portion of the peripheral wall is greater than a maximum radial dimension of the threaded portion of the screw.

The invention also relates to a method for implementing a positive locking fastener according to the invention. The method according to the invention comprises the following steps:
- inserting the screw into a previously made hole in a structural assembly consisting of structural elements to be held together;
- placing the nut on the screw by applying a tightening torque;
- placing the cap on the tightening portion of the nut;
- if the radial hole is not aligned with a pair of openings of the cap, removing the cap in a vertical direction, rotating the cap about its main axis, in a given direction of rotation, by an angle equal to the angular period θ, then resetting the cap;
- inserting the pin into the aligned apertures and radial holes.

BRIEF DESCRIPTION OF THE FIGURES

The invention will be better understood on reading the following description and examining the accompanying figures. These are presented only by way of non-limiting indication of the invention.

FIGS. 6a; 6c; 6e and 6g represent cross-sectional views along a horizontal plane of the screw and of the nut in various orientations of the nut relative to the screw.

FIGS. 6b; 6d; 6f and 6h represent cross-sectional views along a median plane of the oblong holes of the locking portion of the cap.

The figures are schematic diagrams proposed for a good understanding of the invention and are not necessarily scaled.

DETAILED DESCRIPTION

In the description, the terms "horizontal" and "vertical displacement" must be interpreted with reference to the configuration of the elements on the drawings and to an associated orthonormal coordinate system (O; X; Y; Z).

A vertical direction ΔL is given by the direction of the axis (OZ).

A plane parallel to the plane (OXY) is therefore a horizontal transverse plane and any axis of such a plane has a horizontal direction. Throughout the description, the angles are expressed in degrees.

Figure 1A:
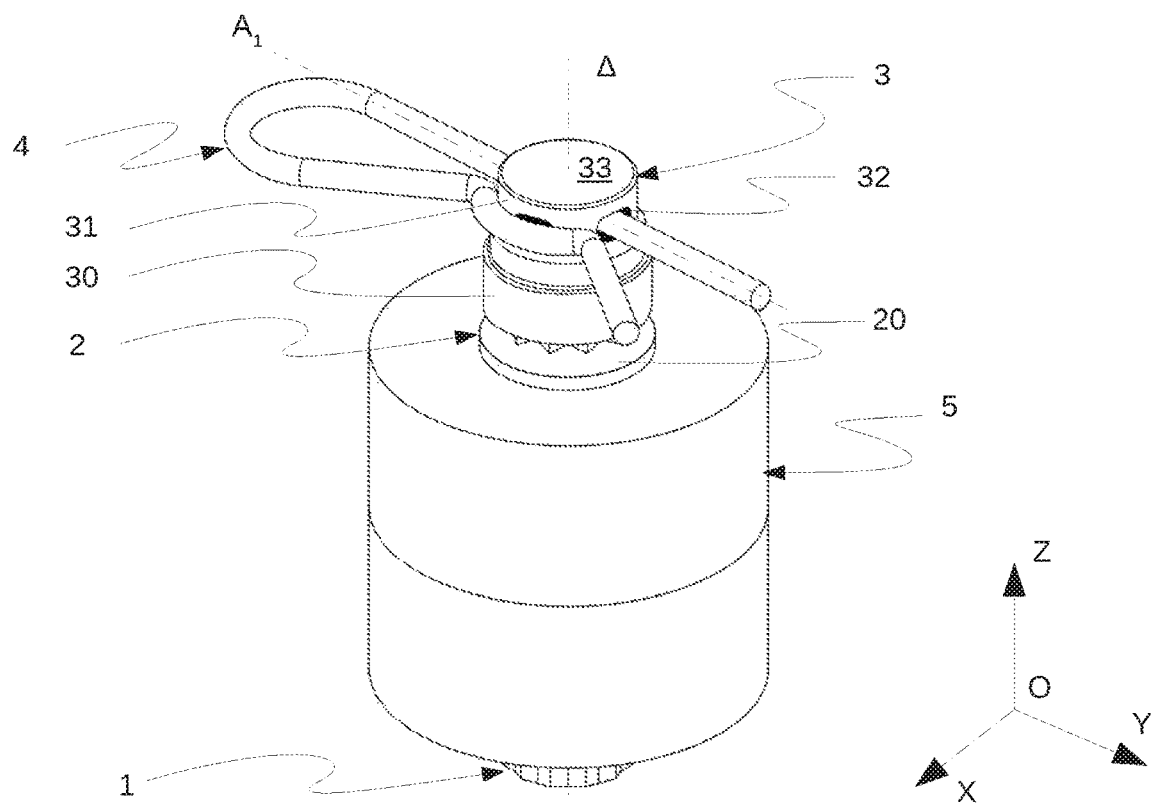
FIG. 1A shows an isometric view of a positive locking fastener according to the invention, holding a structural assembly, in an exemplary embodiment of the invention in which the cap has two pairs of openings.
Figure 1B:
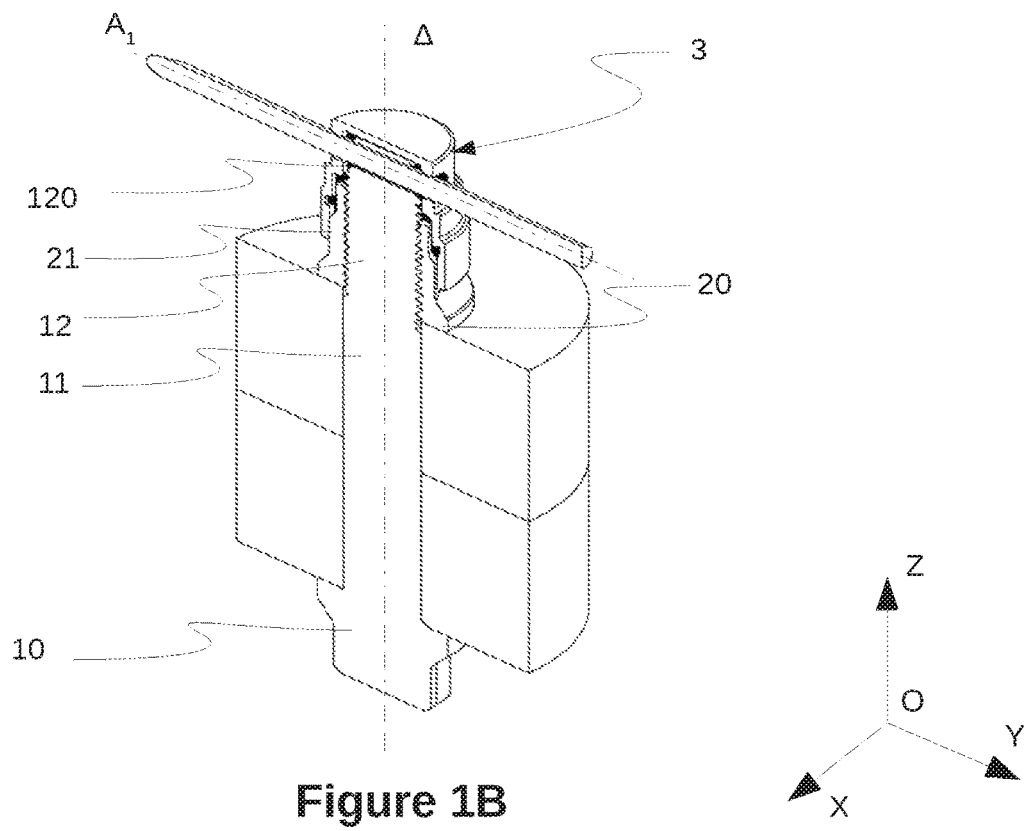
FIG. 1B shows an isometric view with cross-section along the plane (OYZ) of the locking device in the embodiment of FIG. 1

With reference to FIGS. 1A and 1B, a fastener comprising a screw 1 and a nut 2 holds together two structural elements forming a structural assembly 5.

The screw 1 extends along a vertical longitudinal axis Δ and has a head 10, a body 11 and a threaded portion 12 traversed by a radial hole 120, an axis $A_1$ of said radial hole being secant and perpendicular to the longitudinal axis Δ. The radial hole 120 is located in a portion of the screw 1 protruding from the nut 2 on the side opposite the structural assembly 5 when the nut 2 is placed, near one end of the screw 1, for example at a distance between 1 mm and 1 cm from said end. The radial hole 120 is of section adapted to the passage of an a priori cylindrical pin rod of circular cross-section.

When the screw 1 is installed, the nut 2 is screwed onto the threaded portion 12 of said screw with application of a nominal tightening torque, so that the structural elements of the structural assembly 5 are held together by the screw 1 and the nut 2 with the desired pre-tensioning force.

The nut 2 comprises a base 20, in contact with the structural assembly 5, and a tightening portion 21 allowing the application of the tightening torque, by means of a tool comprising a socket of complementary shape to said tightening portion.

Figure 2:
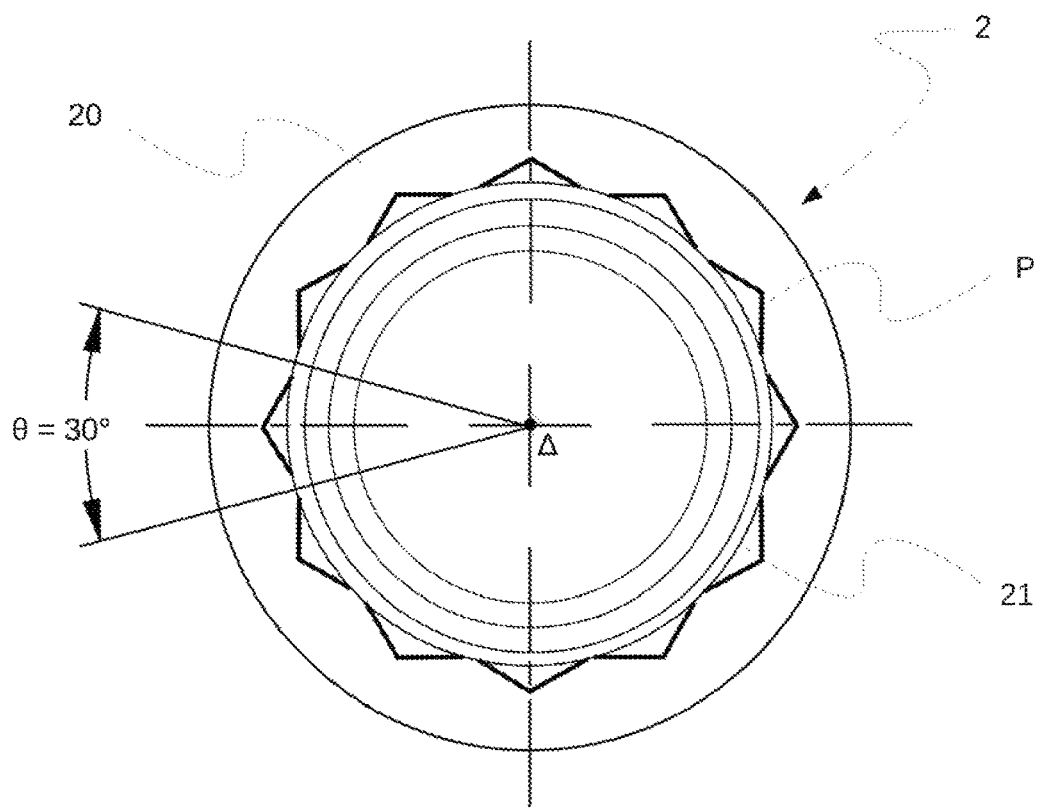
FIG. 2 shows a top view of a twelve-point nut.

With reference to FIG. 2, the tightening portion 21 has an outer face defining, in a horizontal plane, a star-shaped profile P with twelve vertices, shown in thick solid line in the figure, said profile thus having an angular period θ about an axis substantially coincident with the longitudinal axis Δ when the nut 2 is placed. In the embodiment described in the figures, the nut 2 is a twelve-point nut, and the angular period θ of the profile is 30°.

After tightening the nut 2 on the screw 1, a cap 3 according to the invention is installed over the nut 2 and the screw 1.

Figure 3:
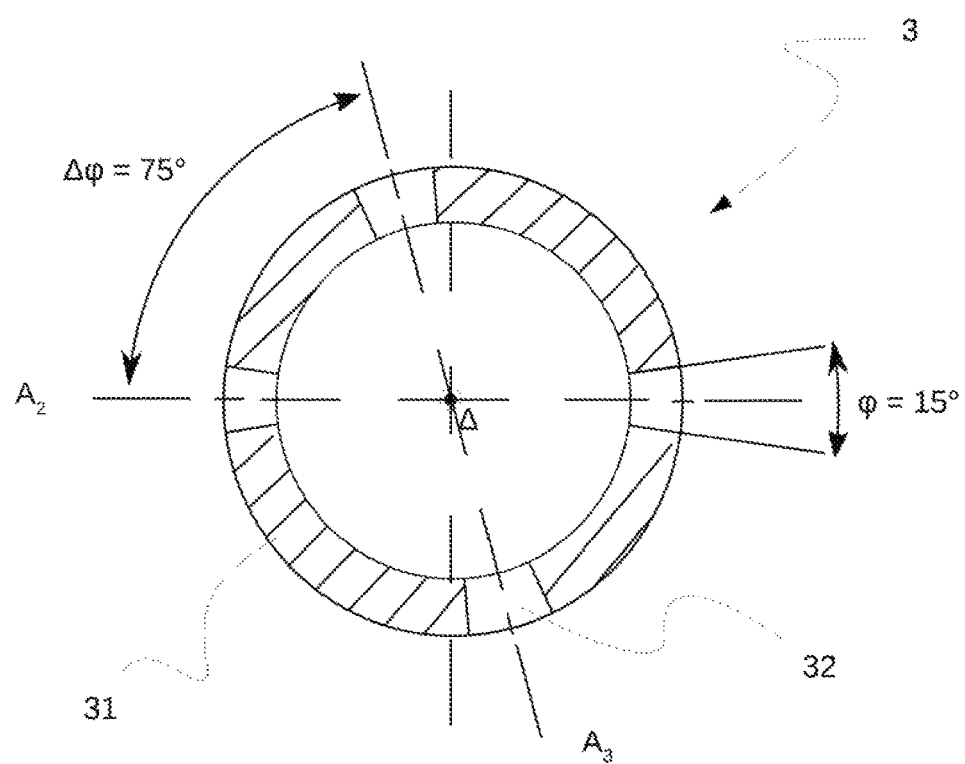
FIG. 3 shows a cross-sectional view of the cap along a median horizontal plane of the oblong holes of the locking portion of the cap in the embodiment of FIG. 1A.
Figure 5:
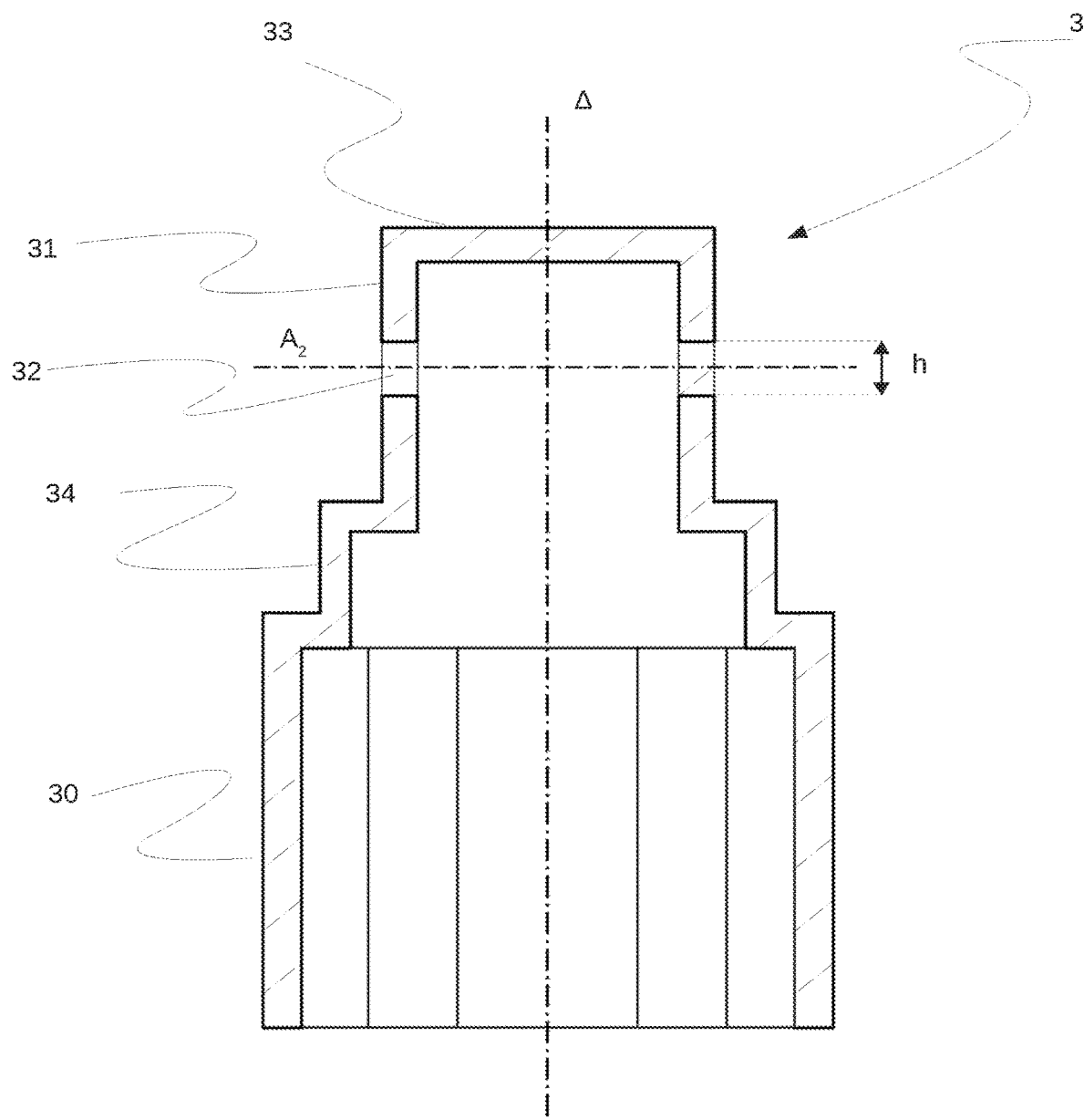
FIG. 5 shows a view of the cross-section cap along a meridian plane.

With reference to FIGS. 3 and 5, the cap 3 comprises a blocking portion 30 at a first end and a locking portion 31 at a second end.

The blocking 30 and locking portions 31 are fixedly connected to each other, if necessary by means of a connecting portion 34.

The cap 3 determines a substantially axisymmetric hollow shape about a main axis, which main axis is substantially coincident with the axis Δ of the screw 1 when it is installed.

The blocking portion 30 determines an inner surface that corresponds to a housing for the nut 2 on which said cap is intended to be placed. This inner surface also has a shape and dimensions so that not only the blocking portion 30 engages on the tightening portion 21 of the nut but also a rotation of the cap 3 with respect to the nut 2 is impossible in the engaged position. By rotation impossible, it must be understood without damaging the cap and in the required or inevitable play limit to allow the cap to be mounted in view of the manufacturing tolerances of the cap 3 and of the nut 2.

The blocking portion 30 has, for example, an inner surface complementary to the outer surface of the tightening portion 21 of the nut.

A configuration of the cap 3 with respect to the threaded portion 12 and the tightening portion 21 can be modified by vertically removing said cap, by carrying out one or more rotations of said cap about the axis Δ, of an angular pitch of 30° equal, in the example illustrated, to the angular period θ of the profile P of the tightening portion 21, and then by placing the cap 3 vertically. In the exemplary embodiment illustrated in the drawings, there is, due to the angular periodicity of the profile P, twelve possible angular positions of the cap 3 on the nut 2, which can be obtained from a given initial angular position, by eleven successive rotations of the cap 3 by a step of 30° (or the θ degrees) in a given direction of rotation or in the other.

The locking portion 31 determines an internal volume whose dimensions, determined by a side wall of said locking portion, are defined to contain a free end of the screw 1 on which the nut 2 is placed.

In a preferred embodiment, the internal volume of the locking portion 31 is cylindrical with a circular cross-section of axis the main axis and of a diameter greater than the maximum diameter of the threaded portion 12 of the screw 1, for example the maximum diameter of said threaded portion increased by a clearance in order to place the cap without effort and without damaging the cap and or the thread of the screw 1.

In the embodiment illustrated in the figures, the locking portion 31 comprises a wall 33 closing the locking portion 31 at the second end, making it possible in particular to stiffen the cap 3 or to seal the fastener. This wall 33 is optional, the internal volume of the locking portion 31 being openable.

Furthermore, with reference to FIG. 3, the side wall of the locking portion 31 comprises two pairs of through openings 32 (holes or notches for example). The openings of a pair are arranged symmetrically with respect to the main axis in a direction defined by centers of said openings of the at least one pair. Thus, a first pair determines a first direction carried by an axis A2 and a second pair determines a second direction carried by an axis A3.

Furthermore, the openings 32 are all located substantially at a same height on the main axis and the axes A2 and A3 form an angle Δφ. In the example illustrated, Δφ is equal to 75° to ensure sufficient canvas between two adjacent openings 32. Depending on the material of the cap, this angle may have other values, as will be understood hereafter. In this example, all the openings 32 are similar in dimensions and with a height h along the direction of the main axis and a length defined by an angular sector φ in the median horizontal plane. The dimensions of the openings 32 are adapted to allow a rectilinear portion of a pin 4 to be inserted. The angular sector φ is determined with respect to the angular period θ of the periodic profile P of the tightening portion 21 of the nut 2, according to the relationship:

$$\varphi = \frac{\theta}{2}$$

In the exemplary embodiment illustrated in the figures, the openings 32 are oblong holes, the angular period θ is equal to 30°, the angular sector φ is equal to 15°. Thus, the two adjacent openings 32 cover the same angular sector as a panel of the nut.

When the cap 3 is placed on the threaded portion 12 of the screw 1 and the tightening portion 21 of the nut 2, the rectilinear portion of the pin 4 passes through the radial hole 120 and two diametrically opposite openings 32 of a pair of openings, a curved portion of the pin 4 bearing on an outer surface of the second portion of the cap 3 to ensure that said pin is held in said cap. A shape of the curved portion is adapted to conform to the outer surface of the cap. Advantageously, the pin employed is a spring pin.

In order to allow the pin 4 to be inserted into the cap 3, it is appropriate for the axis A of the radial hole to be substantially coincident with one of the axes $A_2$ or $A_3$ of the pairs of openings, that is to say that an angle formed by the axis A with one of the axes $A_2$ or $A_3$ is less than or equal to the angular sector φ, equal to θ/2 in the example illustrated.

The choice of angular sectors φ covered by the openings 32 and the angle Δφ between directions of the two pairs of openings 32 is such that, regardless of the position of the cap on the nut, and the manufacturing tolerances, a first angular sector $\varphi_1$ of a first pair of openings is always located opposite a same first half-period of 15° of a panel of the nut 2, and the second angular sector $\varphi_2$ of the second pair of openings 32 is always located opposite a same second half-period of 15° of a panel of the nut, the first and second half-periods covering different portions of the same pattern, and the set of half-periods covering a period of period θ.

Figure 4:
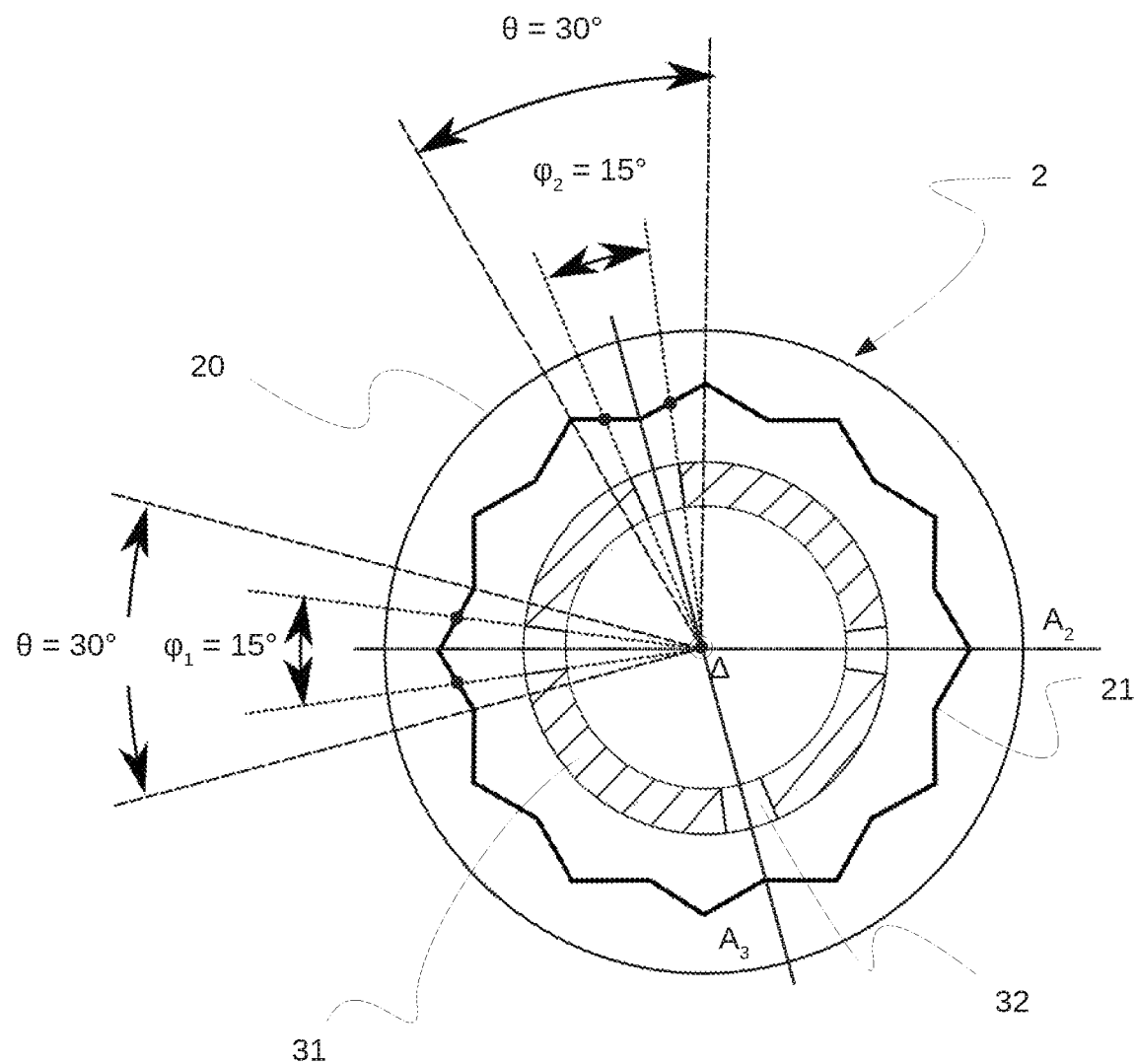
FIG. 4 shows the angular sectors covered by two openings belonging to two pairs of different openings, in an embodiment in which the cap has two pairs of openings.

FIG. 4 illustrates a relative position of the openings 32 of the cap 3 relative to the tightening portion 21 of the nut 2. In an initial configuration of the cap 3 with respect to the nut 2, in the embodiment illustrated in FIG. 4, the angular sector $\varphi_1$ of 15° makes it possible to cover with the pin 4 inserted into the pair of openings 32 associated with the axis $A_2$ an angular sector of 15° corresponding to a first half-period of an elementary pattern of the profile P, for example a half-period comprising the apex of a side of the nut. The second angular sector $\varphi_2$ of 15° corresponds to a second half-period of said elementary pattern, for example the half-period comprising a recess of a side of the nut.

It is therefore possible, by suitable rotation of the cap 3, to find a position of the cap 3 making it possible to substantially align the axis A with one of the axes $A_2$ or $A_3$ without modifying the position of the nut relative to the radial bore of the screw. The angular sectors φ covered by the holes 32 and the angle Δφ between the directions of the two pairs of holes 32 therefore make it possible to find a position of the cap 3 allowing the insertion of the rectilinear part of the pin 4 whatever the relative orientation of the radial hole 120 of the screw 1 with respect to the nut 2 is.

It should be noted that this reasoning is valid for other values of the angle Δφ, for example 45°, 105° or 135°. These values correspond to odd integer multiples, different from 1, of the angular half-period equal to θ/2 for the examples cited, rotation of one step, three steps or four steps of 30° respectively makes it possible to cover a given elementary angular sector.

FIGS. 6a to 6d show the extreme positions of the cap 3 relative to the pin 4 for an angle formed between the screw 1 and the nut 2 varying from −7.5° to 7.5°, this angle being defined as the web between the axis A1 of the radial hole 120 and a horizontal axis intersecting the axis Δ and passing through a reference point M of the tightening portion 21. Said first range of values can be completely covered by a first pair of openings 32.

FIGS. 6e to 6h show the extreme positions of the cap 3 relative to the pin 4 for an angle formed between the screw 1 and the nut 2 varying from 7.5° to 22.5°. This second range of values cannot be covered by the first pair of openings 32, the cap 3 is thus rotated by one step so that the second pair of openings 32 is substantially aligned with the radial hole 120. The second pair of openings 32 covers this second range of values, and thus a range of 30° has been covered. Due to the periodicity of the profile of the tightening portion 21, it is therefore possible to set the cap 3 in place for any orientation of the nut 2 with respect to the screw 1.

The cap 3 allows the locking of the nut 2, and the pin 4 enables the locking of the screw 1 and the cap 3. The locking fastener according to the invention thus allows positive locking of the fastener, the presence of the cap 3 and of the pin 4 making it possible to limit the possible loosening of the nut 2 with respect to the screw 1.

Figure 7A:
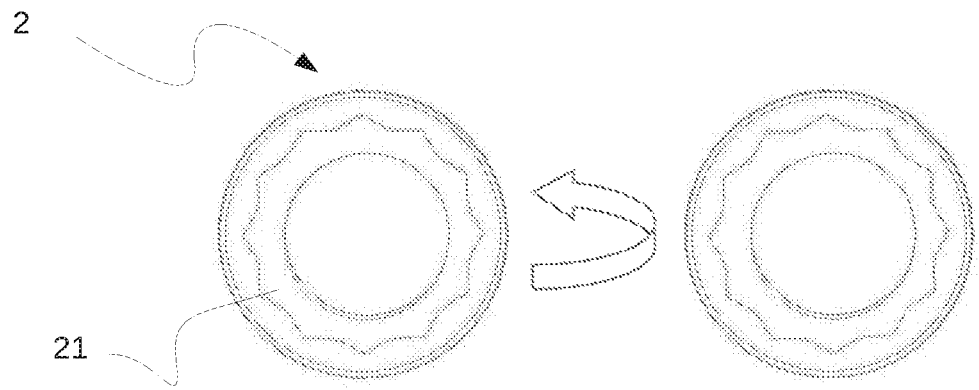
FIGS. 7a -7c represent the assembly clearances between the various elements of the fastener according to the invention.
Figure 7B:
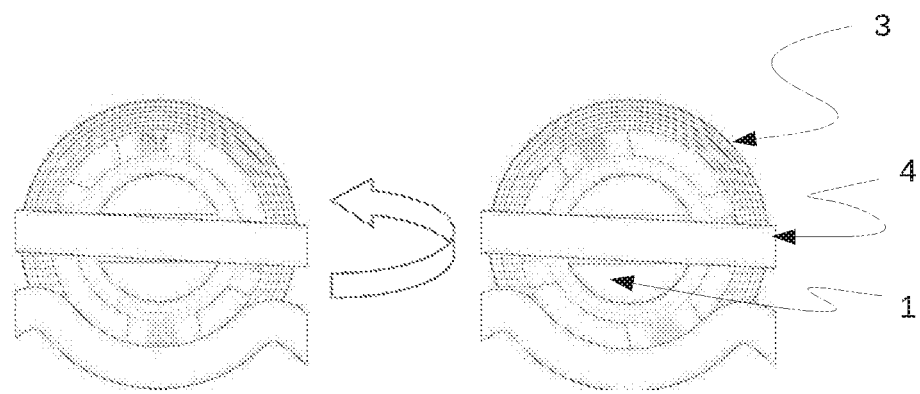
Figure 7C:
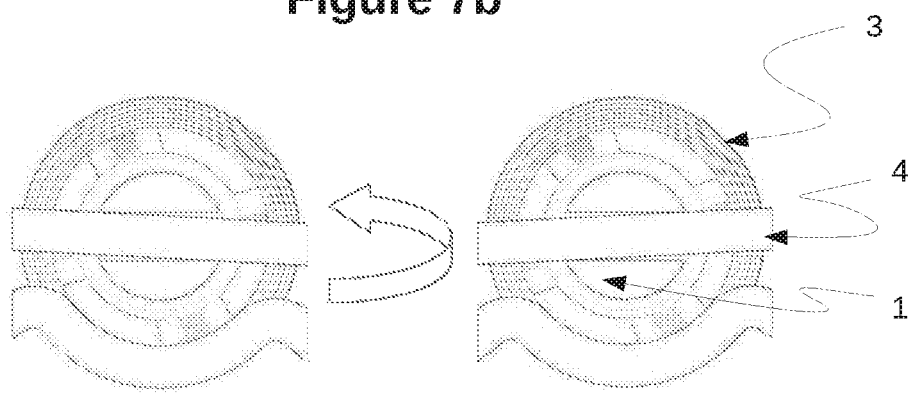

With reference to FIGS. 7a-7c, there are clearances inherent to the mounting of the fastener according to the invention. FIG. 7 illustrates the maximum angular play existing between the nut 2 and the cap 3. FIG. 7b illustrates the maximum clearance existing between the pin 4 and the cap 3. FIG. 7c illustrates the maximum clearance existing between the pin 4 and the screw 1.

In practice, the fastener according to the invention has a maximum loosening of approximately 27° due to the existence of these clearances, corresponding to a maximum preload loss of approximately 9%. The term "maximum preload loss" is understood to mean the loss of preload in the most pessimistic scenario of loosening the fastener, that is to say maximum loosening.

It should be noted that this reasoning is not limited to the exemplary embodiment illustrated but can extend to any profile P of the tightening portion 21 having an angular period θ strictly less than 90°. An advantage of the invention is that it allows positive locking of the fastener without having to modify the nominal tightening of the nut 2 during its installation, to allow the alignment of the radial hole 120 with the openings 32 of the cap 3.

Also, this reasoning can be generalized to a number N of pairs of openings 32 greater than or equal to 1, the angular sector φ then being equal to:

$$\varphi = \frac{\theta}{N}$$

An angle $\delta\varphi_p$, where p is an integer between 1 and N–1, between a direction of a p-th pair of holes 32 and a direction of a pair of reference holes is such that:

for each of the pairs of openings 32, whatever the position of the cap 3 when the latter is placed on the nut 2, a pair of openings 32 covers one and the same portion of an angular sector element of angular amplitude θ, said portion being associated with a portion of the elementary pattern of the tightening portion 21 of the nut 2;

a union of the portions of the elementary angular sector covered by half the openings of said pairs of openings covers the entire of said elementary angular sector.

In order to achieve these two conditions, the angle between two directions of pairs of openings is, for example, the shape:

$$\Delta\varphi_p = p\left(\theta + \frac{\theta}{N}\right)$$

wherein 1≤p≤N–1.

It should be noted that two pairs of openings need not be separated by a multiple angle of the angular period θ, without which one of the two pairs would be redundant, since the two pairs of openings would then be associated with a same portion of the elementary angular sector.

Figure 8:
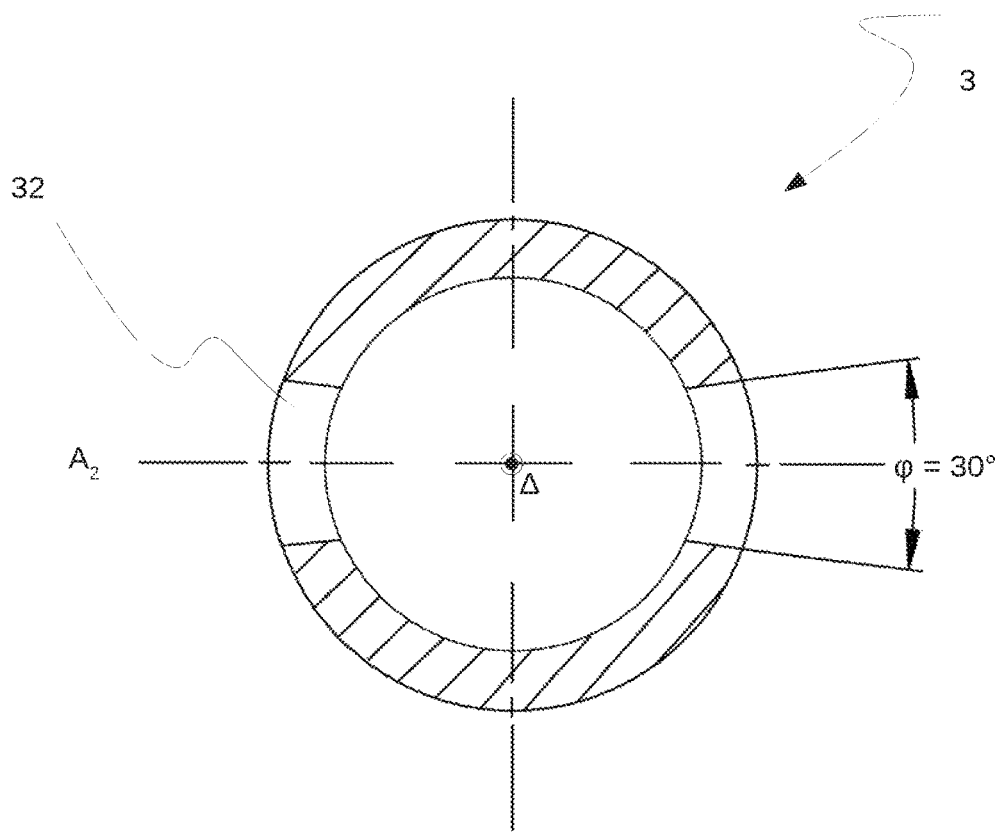
FIG. 8 shows a cross-sectional view of the cap along a median horizontal plane of the oblong holes of the locking portion of the cap in an exemplary embodiment in which the cap has a single pair of openings.

The number of pairs of openings 32 may, for example, be equal to 1, as illustrated in FIG. 8.

Figure 9:
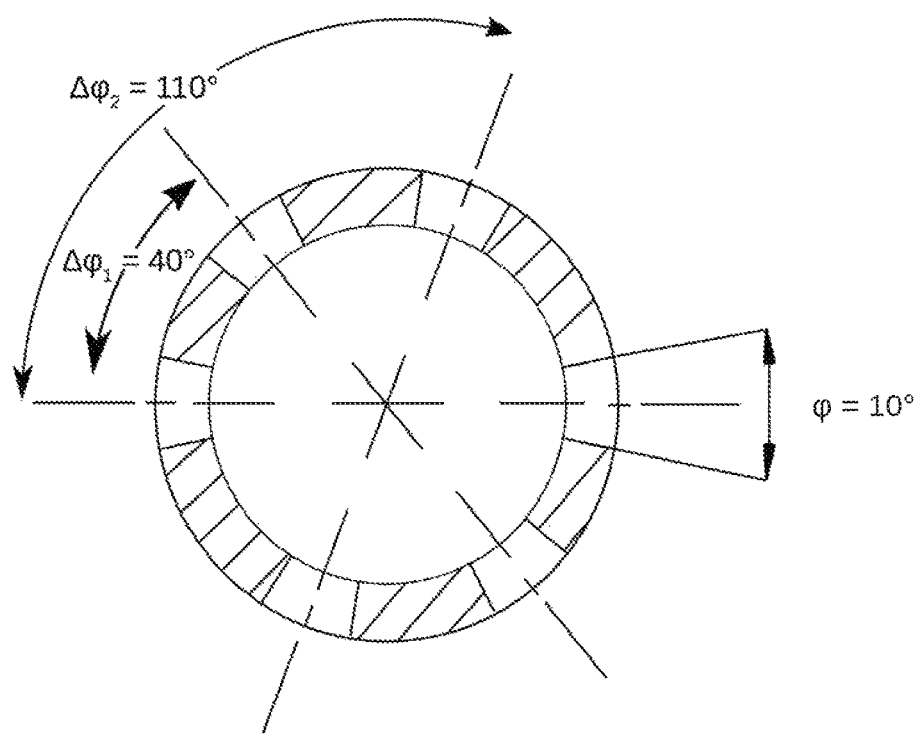
FIG. 9 shows a cross-sectional view of the cap along a median horizontal plane of the oblong holes of the locking portion of the cap in an exemplary embodiment in which the cap has three pairs of openings.

The number of pairs of openings 32 can also be greater than or equal to 3, as illustrated in FIG. 9 representing a cap 3 having 3 pairs of openings. In this example, the angular period θ is 30°, the angular sector φ is 10°. A first pair of holes 32 is separated from a pair of reference holes by an angle Δφ of 40°. A second pair of holes is separated by an angle $\Delta\varphi_2$ of 110° from said pair of reference holes.

Figure 10:
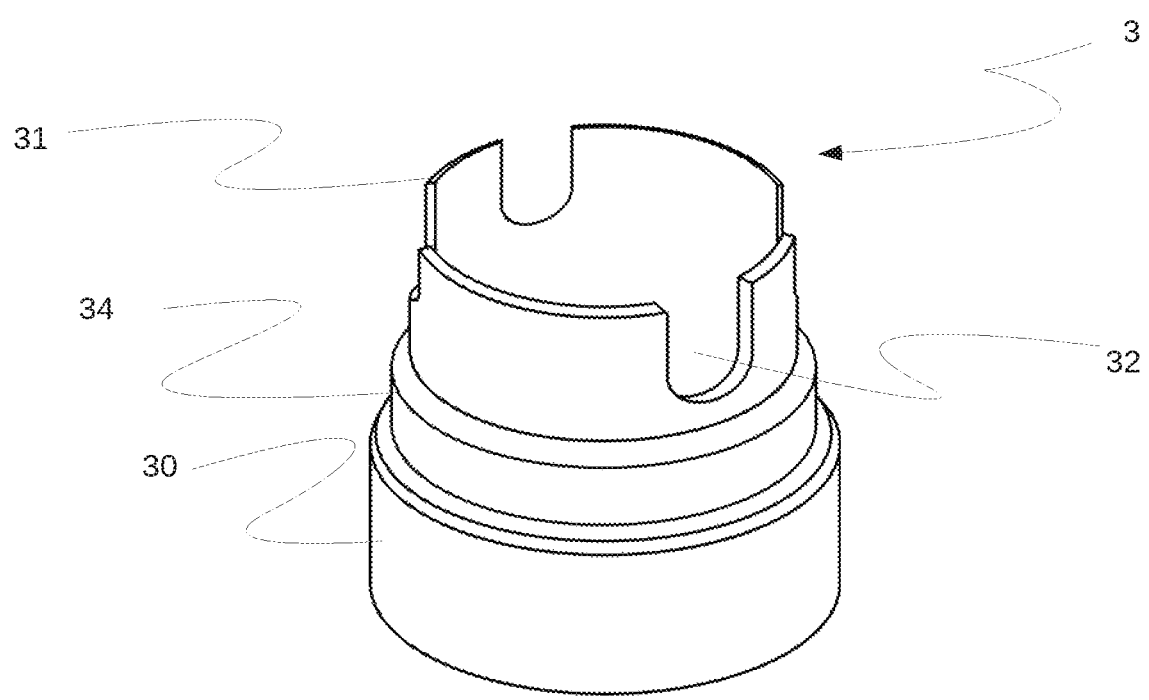
FIG. 10 shows an isometric view of a cap in an embodiment in which the openings of the cap are notches.

The openings 32 may also be notches, as illustrated in FIG. 10.

The invention claimed is:

1. A cap intended to engage with a nut and intended to receive a pin, said nut comprising a tightening portion of angular period θ about a main axis of said nut, said cap being substantially axisymmetric about a main axis and comprising:
    a blocking portion at a first end, said blocking portion defining an inner surface corresponding to a housing intended to engage with the tightening portion of the nut so that the main axis of said nut is substantially coincident with the main axis of the cap when said cap is in place on said nut;
    a locking portion at a second end, a side wall of said locking portion comprising at least one pair of through openings adapted to receive the pin, said openings of one pair being arranged symmetrically with respect to the main axis, in a direction defined by centers of said openings of the pair, the openings being similar in dimensions with a height h along the direction of the main axis and a length defined by an angular sector φ intended to allow a movement of a rectilinear part of the pin in any of the at least one pair of openings, said openings being located substantially at a same height of said main axis;
    said blocking and locking portions being fixed and secured together and said cap being characterized in that the angular sector φ is equal to:

$$\varphi = \frac{\theta}{N}$$

where N is a number of pairs of openings.

2. The cap according to claim 1, wherein the locking portion comprises at least two pairs of openings and in that the pairs of openings are arranged such that:
    for each of said pairs of openings, regardless of the position of said cap when the latter is in place on the nut, a pair of openings covers a single portion of an elementary angular sector, with angular amplitude θ, said portion being associated with a portion of the elementary pattern of the tightening portion of the nut;
    an union of the portions of the elementary angular sector covered by half the openings of said pairs of openings covers the entire of said elementary angular sector.

3. The cap according to claim 1, wherein the openings are notches.

4. The cap according to claim 1, wherein the openings are oblong holes.

5. The cap according to claim 1, characterised in that the blocking portion and the locking portion are connected together by a connecting portion.

6. The cap according to claim 1, characterised in that the cap comprises a plate closing said cap at the second end.

7. A positive locking fastener comprising:

a screw having a threaded portion comprising a radial hole passing through said threaded portion;

a nut intended to be placed on the screw, said nut comprising a tightening portion of which an outer surface defines in a horizontal plane a profile (P) of angular period θ about a main axis of said nut:

said fastener being characterized in that it further comprises:

a cap according to claim 1, an inner volume of the locking portion being of defined dimensions for containing a free end of the screw projecting from the nut, said cap being further intended to engage with the tightening portion of the nut, the inner surface of the blocking portion forming an imprint complementary to the profile (P) of the tightening portion and the angular sector φ being equal to a fraction of the angular period of said profile (P);

a pin having a rectilinear portion intended to be inserted into a pair of openings of the cap and in the radial hole of the screw, when said holes and openings are aligned, so as to lock the fastener.

8. A positive locking fastener according to claim 7, wherein:

the nut is a twelve-sided nut defining a star-shaped profile (P) at twelve vertices of angular period 30°;

the cap comprises two pairs of openings; the angular sector φ is equal to 15°;

the angular offset Δφ between the pairs of openings is equal to 75°.

9. The fastener according to claim 7, characterised in that the pin comprises a curved part capable of conforming to an outer surface of the locking portion of the cap in order to hold said pin in place.

10. The fastener according to claim 7 characterized in that the pin is a spring pin.

11. The fastener according to claim 7 characterized in that a minimum radial dimension of the first portion of the peripheral wall is greater than a maximum radial dimension of the threaded portion of the screw.

12. A method for implementing a positive locking fastener according to claim 7, characterized in that it comprises the following steps:

inserting the screw into a previously made hole in a structural assembly consisting of structural elements to be held together;

placing the nut on the screw by applying a tightening torque;

placing the cap on the tightening portion of the nut;

if the radial hole is not aligned with a pair of openings of the cap, removing the cap in a vertical direction, rotating the cap about its main axis, in a given direction of rotation, by an angle equal to the angular period theta, then resetting the cap;

inserting the pin into the aligned openings and radial hole.

* * * * *